United States Patent Office 3,017,447
Patented Jan. 16, 1962

3,017,447
SILICA CONTAINING BATTERY PLATES
Joseph Anthony Orsino, Mountain Lakes, N.J., and Edward J. Dunn, Jr., Port Washington, N.Y., assignors to National Lead Company, New York, N.Y., a corporation of New Jersey
No Drawing. Filed July 2, 1959, Ser. No. 824,459
5 Claims. (Cl. 136—26)

This invention contemplates a plate for lead acid storage batteries, containing therein a silica-cored red lead and/or silica-cored litharge containing paste. The preparation of the silica-cored lead oxides has been described in our copending application Serial No. 809,344, filed April 28, 1959, and assigned to the assignee hereof. This application is a continuation in part of our copending application cited above.

Silica $SiO_2$, is used as a pigment when finely divided, and is most often used as a diluent or extender pigment in low cost paints. Silica has not been previously used in battery plate pastes in the manner contemplated in the present invention.

Red lead has been used in the past in the active material paste for the plates of storage batteries. Generally such a paste contained about ¼ red lead and ¾ litharge. It was found however, that the cost of the red lead was prohibitive and in many cases, the red lead shed out of the positive plate with a resultant shorter life for the plate. Today, generally speaking, straight uncalcined litharge is used in the paste for the plate. The use of red lead has substantially been eliminated. Red lead, however, has an important advantage when used in batteries. The use of red lead in the positive plate paste results in a shorter formation time; that is, the time needed to convert the lead in the negative plate to metallic lead and the lead in the positive plate to lead peroxide. Litharge is used in both the positive and negative plates. The amount of oxides required to make up the paste for various plates depends upon the rating which is to be given to the cells provided with the plates in question. Application of Faraday's laws of electrolysis shows theoretically that for each ampere hour rating, 0.148 oz. of litharge and 0.151 oz. of red lead are required for the negative and positive plates respectively. When the plates are formed, this corresponds to 0.137 oz. of spongy lead on the negative and 0.158 oz. of lead peroxide on the positive. In practice, however, owing to the fact that all of the lead oxide is not active, due to lack of porosity, from two to four times more active material is employed than theory would indicate; the ratio depending upon the thickness of the plates and the arrangement of the material. Since it is only the surface of the lead oxide that is active, much of the lead contributes nothing to battery capacity or conductivity. In addition, in a storage battery, there is generally not enough acid present to react with more than ½ of the lead present.

The batteries used in guided missiles, torpedoes, and aircraft in general, would weight less if a silica cored lead oxide were used instead of the conventional lead oxide. As mentioned previously, the core of the conventional lead oxide particle contributes nothing to the capacity of the battery, and thus the core of the conventional lead oxide particle is merely an added weight detracting from the efficiency of the missile, torpedo, or aircraft in general by the additional useless weight.

An object of this invention therefore, is to provide a storage battery weighing far less than a conventional battery of its type. Still another object is to provide a battery plate paste containing a silica cored lead oxide. An additional object is to provide a battery plate containing a silica cored red lead which is not subject to flaking off. Another object is to provide a battery plate containing a silica cored litharge. Yet an additional object is to provide a battery plate containing a silica cored red lead which is not subject to flaking off, and which is economical. An additional object is to provide a battery with a shorter formation time.

Other objects and advantages will become apparent from the following more complete description and claims.

Broadly, this invention contemplates a plate for lead-acid storage batteries, wherein said plate contains a paste, said paste containing at least one silica cored lead oxide.

It is preferred however to use a small amount of silica and a large amount of lead oxide for battery purposes because when too high a proportion of silica is used, the volume of silica in the plate merely contributes added bulk without further improving the efficiency of utilization of the lead oxide.

When a lead oxide is used in the grid plate paste, only the surface of the lead oxide particle is active.

The silica cored lead oxide may, if desired, be used in admixture with conventional lead oxide.

The ratio of silica to lead oxide in a silica-cored lead oxide particle may vary widely and still be operable for use in an active material paste. Generally speaking, the silica-cored lead oxide should contain from 5% to 20% of silica and from 95% to 80% of lead oxide based on the total weight of lead oxide plus silica. Below 80% of lead oxide, the battery will not be operable unless straight lead oxide containing no silica core is also used. While the battery will be quite operable if the percentage of lead oxide is greater than 95%, no advantage can be gained from employing such a large amount of lead oxide in a silica-cored lead oxide particle.

The grid plate pastes, both negative and positive, may consist entirely of silica-cored red lead, or they may contain a mixture of silica-cored red lead and silica-cored litharge, or they may contain silica-cored litharge only, or they may contain a silica-cored lead oxide particle wherein the lead oxide of said particle is a mixture of red lead and litharge. The materials contained in the grid plate pastes are prepared as described in copending application Serial Number 809,344 which contemplates a cocalcined silica-cored lead oxide particle, wherein the silica and lead oxide or oxides are ground together in an aqueous slurry in a ball mill. It is believed that the grinding activates the surface of the silica making it receptive to the fine particles of oxide or oxides. The length of time for the grinding will vary according to the particular conditions employed, but in the usual case should be from about 4 to 12 hours. Below 4 hours, the surface of the silica is not sufficiently activated and an incomplete coating is produced. There is ordinarily no advantage in employing a grinding time of more than 12 hours. It is preferred, however, to employ a grinding time of 5 hours, as this has been found to produce better results.

The temperature of calcination may vary from 450° C. to 600° C. Below 450 C. very little calcination takes place and the product is a simple mixture of lead oxide particles and silica particles. A temperature of calcination above 600° C. often produces a partially sintered product which is gritty in character.

In the example which follows, reference will be made to the consistency of the plate paste. The consistency is measured by a penetrometer and the results are empirical. The penetrometer used has a bob, a shaft and weights totaling 240 grams. The bob is two inches long, and one-half (½) inch in diameter. The lower three-quarters of an inch of the bob is tapered to a blunt end three thirty-second ($3/32$) of an inch in diameter. The lower end of the bob is suspended 3.1 millimeters above the paste sample and the bob is released. The depth of penetration is reported in millimeters.

A consistency reading of 8 (8 millimeters penetration) indicates a paste consistency roughly equivalent to the stiff paste consistency generally employed in commercial grid pasting machines. A reading of 12 indicates a paste consistency roughly equivalent to a paste consistency employed in machines utilizing softer pastes. A reading of 20 indicates a paste consistency equivalent to the paste consistency employed when hand pasting the grids.

In order to more fully illustrate the nature of this invention and the manner of practising the same, the following example is presented.

*Example*

A paste was made up of 60 cc. of water, 40 cc. of sulfuric acid (sp. gr. 1.400) and 3 lbs. of silica-cored red lead containing 8% silica and 92% red lead. The consistency of the paste was 7, as measured by the penetrometer test described above. This paste was applied to conventional lead storage battery grids and the resulting pasted plates were hydroset. By "hydroset" is meant the method of preparing storage battery plates described and claimed in U.S. Patent No. 2,300,627, of D. A. Merson. The plates were then burned into positive and negative groups. The weight of dry active material per plate was found to be 3.23 ounces. The plates were then formed in 1.060 sp. gr. sulfuric acid for 22 hours, at the end of which they were completely formed. All of the weak sulfuric acid was removed and replaced with sulfuric acid of sp. gr. 1.345. The cells were then charged for 16 hours at 7 amperes, and tested for cell capacity according to S.A.E. storage battery standards. The cell capacity, although lower than would be expected for a cell of similar size pasted with pure lead oxide, was higher than the conventional cell in terms of capacity per gram of cell weight, indicating more efficient electrochemical utilization of the lead and lead oxides present in the cell.

A similar cell, prepared from silica-cored litharge in place of the silica-cored red lead, gives comparable results except that the formation takes somewhat longer.

As has been demonstrated, a battery plate containing a paste wherein a silica-cored lead oxide is incorporated is more economical to produce and use. In addition, as has been shown, a battery plate paste, containing silica-cored lead oxide compares favorably to, or is better than a battery plate paste wherein a lead oxide is used and no silica core is present, in that the utilization of the lead in the silica-cored lead oxide is more efficient. A silica-cored lead oxide therefore has greater capacity per ounce of battery material.

Batteries wherein a silica-cored lead oxide is used should find wide use in the guided missile field, for torpedoes, for aircraft, and in general in all those fields where weight is a problem. The range of such guided missiles, torpedoes, etc. should be increased due to the fact that the same energy required to transmit a missile of given weight over a given distance, should now be able to transmit a missile of lesser weight over a greater distance.

While this invention has been described in terms of certain preferred embodiments and illustrated by means of specific examples, these are illustrative only, and the invention is not to be construed as limited except as set forth in the following claims.

We claim:

1. A plate for lead acid storage batteries, said plate comprising a grid and an active material, said active material containing at least one cocalcined silica-cored lead oxide; said silica-cored lead oxide containing from about 5% to about 20% of silica and from about 95% to about 80% of lead oxide based on the total weight of lead oxide plus silica and where the temperature of calcination of the silica-cored lead oxide is from about 450° C. to about 600° C.

2. A plate for lead acid storage batteries according to claim 1, wherein said silica-cored lead oxide is silica-cored red lead.

3. A plate for lead acid storage batteries according to claim 1, wherein said silica-cored lead oxide is silica-cored litharge.

4. A plate for lead acid storage batteries according to claim 1, wherein said silica-cored lead oxide is a mixture of silica-cored litharge and silica-cored red lead.

5. A plate for lead acid storage batteries according to claim 1, wherein said silica-cored lead oxide is a particle having a silica core, said silica core being substantially covered by a mixture of red lead and litharge.

References Cited in the file of this patent

UNITED STATES PATENTS

| | | |
|---|---|---|
| 633,249 | Rathier | Sept. 19, 1899 |
| 810,929 | Fennell | Jan. 30, 1906 |

FOREIGN PATENTS

| | | |
|---|---|---|
| 272,550 | Great Britain | June 13, 1927 |
| 312,851 | Great Britain | June 6, 1929 |

OTHER REFERENCES

Storage Batteries, G. W. Vinal, 2nd ed. (1930), page 25 relied upon.